United States Patent [19]
McCue et al.

[11] Patent Number: 5,544,363
[45] Date of Patent: *Aug. 13, 1996

[54] AMBULANCE ATTENDANT'S SAFETY VEST AND HARNESS

[76] Inventors: Patrick O. McCue, 5841 E. Calle Del Paisano, Phoenix, Ariz. 85018; Nedward B. Dunnington, 20512 W. Lower Buckeye Rd., Buckeye, Ariz. 85326

[*] Notice: The term of this patent shall not extend beyond the expiration date of Pat. No. Des. 339,217.

[21] Appl. No.: 412,313

[22] Filed: Mar. 29, 1995

Related U.S. Application Data

[63] Continuation-in-part of Ser. No. 114,927, Sep. 2, 1993, abandoned.

[51] Int. Cl.⁶ .............................. A41D 1/02; A41D 13/00; B60R 22/00
[52] U.S. Cl. ........................................ 2/102; 2/2; 297/465
[58] Field of Search .................................. 297/465, 467, 297/484; 280/801 R; 2/94, 102, 2

[56] References Cited

U.S. PATENT DOCUMENTS

| | | | |
|---|---|---|---|
| D. 252,716 | 8/1979 | Chadwick | D2/25 |
| D. 298,475 | 11/1988 | Viio | D29/10 |
| 317,474 | 5/1885 | Strouse . | |
| D. 339,217 | 9/1993 | McCue et al. | D29/11 |
| 1,298,615 | 3/1919 | Wilkinson . | |
| 2,403,653 | 7/1946 | Geohegan et al. | 297/484 |
| 3,380,776 | 4/1968 | Dillender | 297/484 |
| 3,529,864 | 9/1970 | Rose et al. | 297/467 |
| 3,992,040 | 11/1976 | Gannac | 280/744 |
| 4,867,494 | 9/1989 | Cook | 297/484 |
| 5,080,191 | 1/1992 | Sanchez | 280/801.1 |

FOREIGN PATENT DOCUMENTS

| | | | |
|---|---|---|---|
| 1310485 | 10/1962 | France | 297/465 |

OTHER PUBLICATIONS

PCT 93/05986—Jeong—Apr. 1, 1993.

*Primary Examiner*—Bibhu Mohanty
*Attorney, Agent, or Firm*—Warren F. B. Lindsley

[57] ABSTRACT

A vest and harness combination is disclosed comprising a sleeveless vest formed of a fabric material for covering the shoulders, front and back of a wearer. A harness comprising two pairs of spaced webs is secured to said vest. The first pair of spaced webs is attached to and extends longitudinally along the front of said vest. The second pair of spaced webs is attached to said vest and extends laterally of said first pair of webs at least partially around the vest. The first pair of webs extends over the shoulders of said vest, criss crosses the back of said vest and is fastened to opposite sides thereof. The first pair of webs at the point of criss crossing is provided with a slotted ring-like frame through which each of the first pair of webs extends. One of the pair of webs is provided with a second slotted ring-like frame at a point midway of the back of the vest. The other of said second pair of webs is provided with a slotted buckle at one end and a clasp at its other end for engaging said buckle. A plurality of paired ring-like frames is attached to the front of the harness. Each of the first, second and the plurality of paired ring-like frames is detachably connectable to a retractable wall mountable reel for containment of the user of the vest and harness combination in a limited movable position. Further, each of said plurality of ring-like frames is detachably connectable to a variety of accessories.

1 Claim, 5 Drawing Sheets

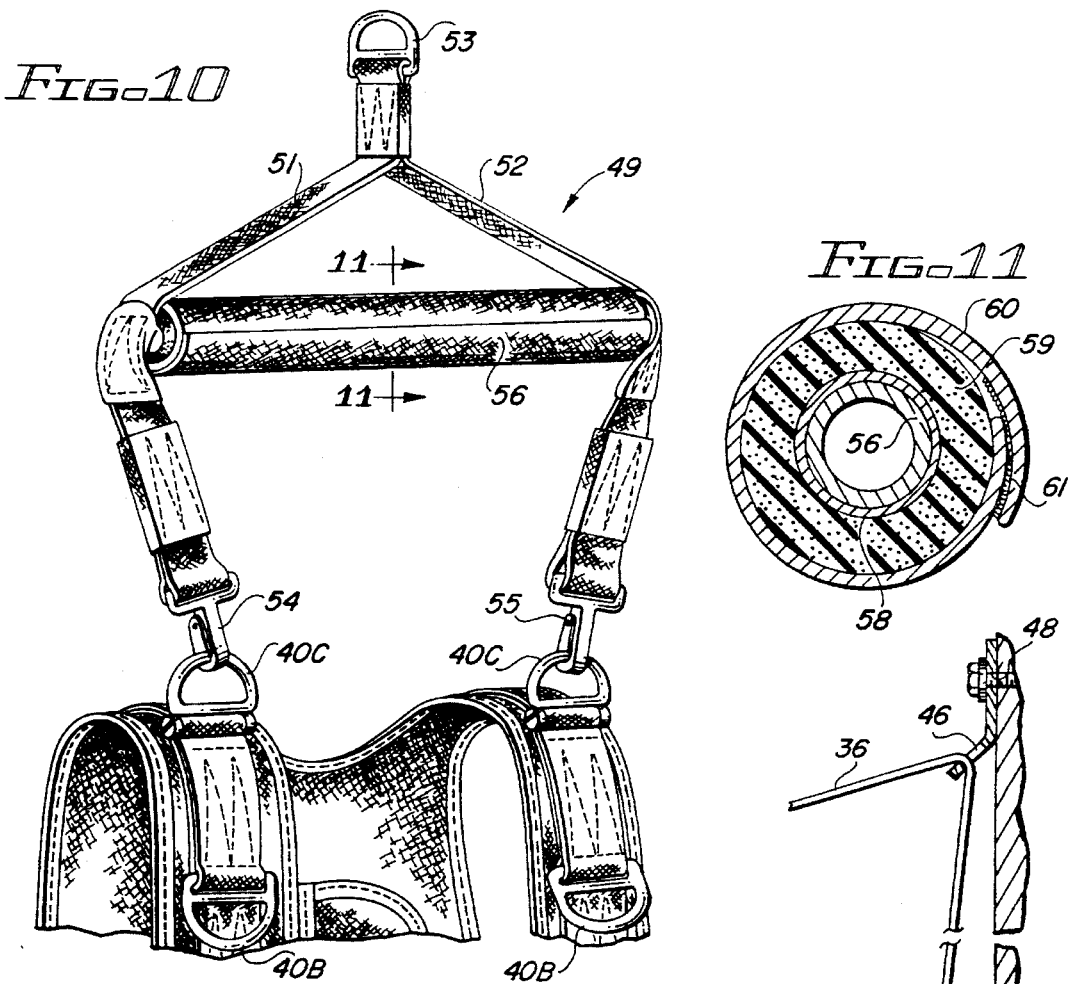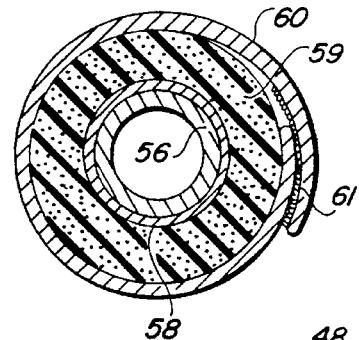

5,544,363

AMBULANCE ATTENDANT'S SAFETY VEST AND HARNESS

RELATED APPLICATION

This application is a continuation-in-part of application Ser. No. 08/114,927 entitled AMBULANCE ATTENDANT'S SAFETY VEST AND HARNESS filed Sep. 2, 1993 now abandoned.

BACKGROUND OF THE INVENTION

This invention relates to a multipurpose purpose safety vest and harness and, more particularly, to one which provides multiple attachments which protect a medical attendant in a moving ambulance and also allow the medical attendant to employ climbing gear or to be raised and lowered by helicopter or other methods to reach patients in difficult circumstances.

Heretofore an attendant in a moving ambulance had to support his or her body to prevent becoming a missile under erratic movement of the vehicle while attempting to provide first aid to a patient. If the attendant remained seated and belted, he could not provide patient care.

In order to overcome this safety hazard, a new and novel multi-purpose vest and safety harness has been provided which may be detachably connected to both sides of the ambulance or connected to the ceiling of the opposite side while still permitting sufficient movement to the attendant so that the patient may be administered to during vehicle movement.

Further, often a hiker or mountain climber may be injured in circumstances which do not permit the medical attendant to reach the prospective patient on foot. Such circumstances often require the use of climbing gear or helicopters to allow the attendant to reach the patient for on-site first aid treatment. After administering first aid, the patient is extricated and taken to an appropriate facility for further treatment.

DESCRIPTION OF THE PRIOR ART

Applicants' U.S. Design Patent U.S. Pat. No. 339,217 discloses a similar type of vest which is shown as connecting to one side of the ambulance only. In addition, the present application is directed to a multi-purpose vest and harness.

U.S. Pat. No. 317,474 discloses a shoulder brace for back support but does not disclose any means for connecting the shoulder brace to the inside walls of an ambulance.

U.S. Design Patent U.S. Pat. No. 252,716 discloses a hang glider harness.

U.S. Design Patent U.S. Pat. No. 298,475 discloses a safety vest.

PCT Publication 93/05986 does not show attachment points positioned at both the front and the rear of the vest.

U.S. Pat. No. 1,298,615 does not show attachment points positioned at both the front and the rear of the vest.

U.S. Pat. No. 3,992,040 does not show attachment points positioned at both the front and the rear of the vest.

None of these patents disclose a vest which provides multiple attachments which protect a medical attendant in a moving ambulance and also allow the medical attendant to employ climbing gear or to be raised and lowered by helicopter or other methods to reach patients in difficult circumstances.

SUMMARY OF THE INVENTION

In accordance with the invention claimed, one object of this invention is to provide a new and improved vest and harness for ambulance attendants which provides for detachable connection to the interior walls of an ambulance while still allowing up to sixty inches (60") of travel in any direction by the attendant to administer first aid to a patient on a gurney in the vehicle.

It is another object of this invention to provide for attachment of climbing gear such as rappelling lines to allow the attendant to reach patients in difficult circumstances.

It is still another object of this invention to provide for attachment of lines to a helicopter or the like to allow the attendant to be raised and lowered to patients in difficult circumstances.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawings, in which:

FIG. 10 is a partial perspective front and left side view of the vest and harness shown in FIG. 8 including an extriction yoke attachment;

FIG. 11 is a cross sectional view of the yoke shown in FIG. 10 taken along line 11—11;

FIG. 12 is a perspective view of the inertial reel for use with the present invention; and FIG. 13 is side view of another embodiment of the inertial reel shown in FIG. 12 employing a webbing guide.

DESCRIPTION OF THE PREFERRED EMBODIMENT

Figure 1:
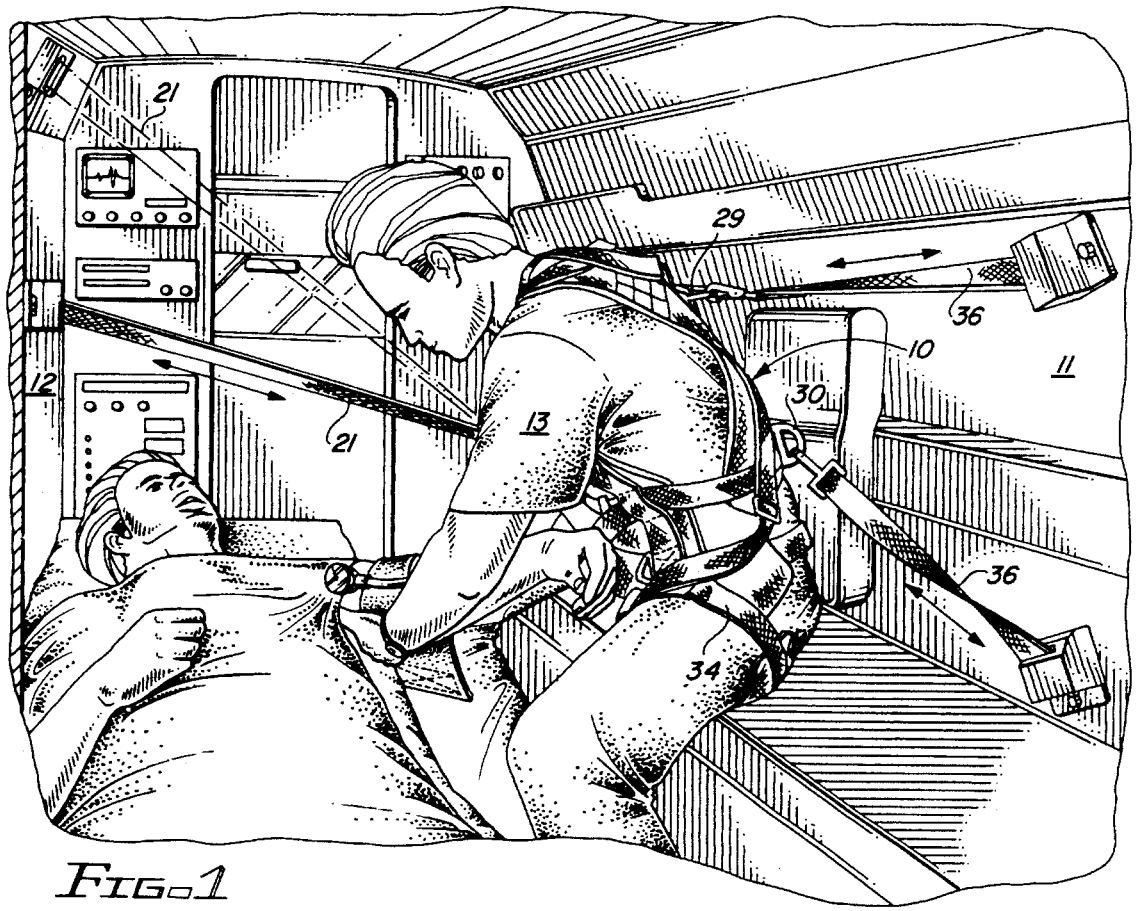
FIG. 1 is a perspective view of the interior of an ambulance showing an attendant wearing one embodiment of the vest and harness disclosed herein while administering first aid to a patient on a gurney.

In accordance with the invention claimed, FIGS. 1–4 and 8–10 disclose an ambulance restraining device 10 for a medical attendant's use which secures the device to both inside walls 11 and 12 or the ceiling of the ambulance while still permitting freedom of movement of the wearer 13 of the device for first aid purposes. One configuration illustrated in FIG. 1 employs inertial reels 37 on walls 11 and 12. Another configuration mounts one inertial reel 37 on wall 11 and the other inertial reel 27 on the ceiling abutting wall 12.

This device comprises a harness and vest combination employing two reversely curved sections 14 and 15 with an intermediate section 16 all formed of a suitable synthetic material such as Cordura Nylon which meets military specifications for stress or shear tests.

Figure 3:
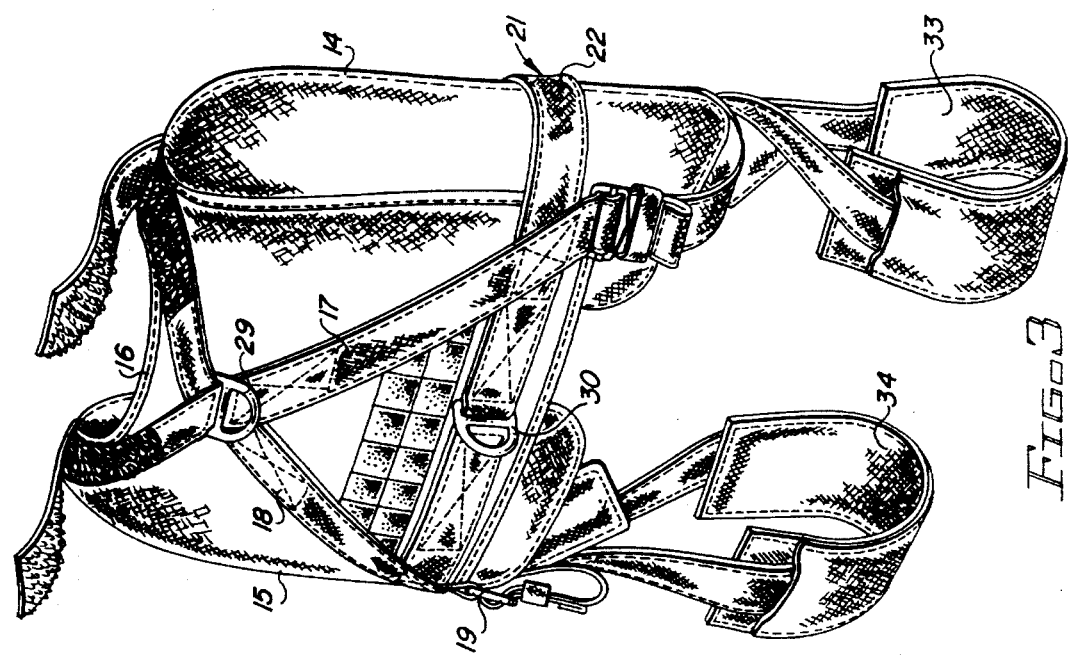
FIG. 3 is a perspective back and right side view of the vest and harness shown in FIG. 2.

As shown in the drawings, the vest comprises shoulder sections 14 and 15 stitched together with section 16 by Nylon 50 pound 5 cord thread to form a sleeveless garment or cut from a single piece of material to form a seamless garment. The garment can be a full cut as best seen in FIGS. 2 and 3 or can be cut down as desired as best seen in FIGS. 8 and 9.

The harness comprises two substantially vertically spaced Nylon webbing strips or webs of material 17 and 18 which preferably meet all military specifications for stress and sheer strength ratings of 6500 pounds. The strips or webs 17 and 18 are suitably stitched to the top and front of the vest to extend downwardly thereof to the arm pit area of a wearer and each web then continues diagonally outwardly on to the base of the vest at which point their free ends are each connected to a metal ring 19 shown in FIGS. 2 and 3 or, more preferably, to a double D-ring 39 illustrated in FIGS. 8 and 9.

Figure 2:
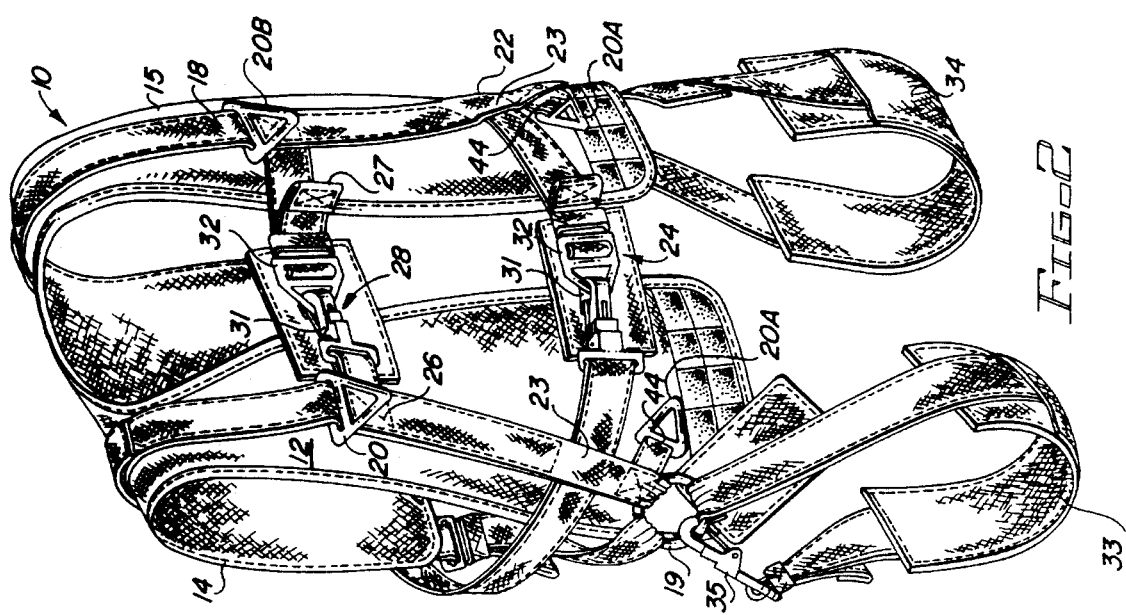
FIG. 2 is a perspective front and left side view of one embodiment of a vest and harness embodying the invention.
Figure 8:
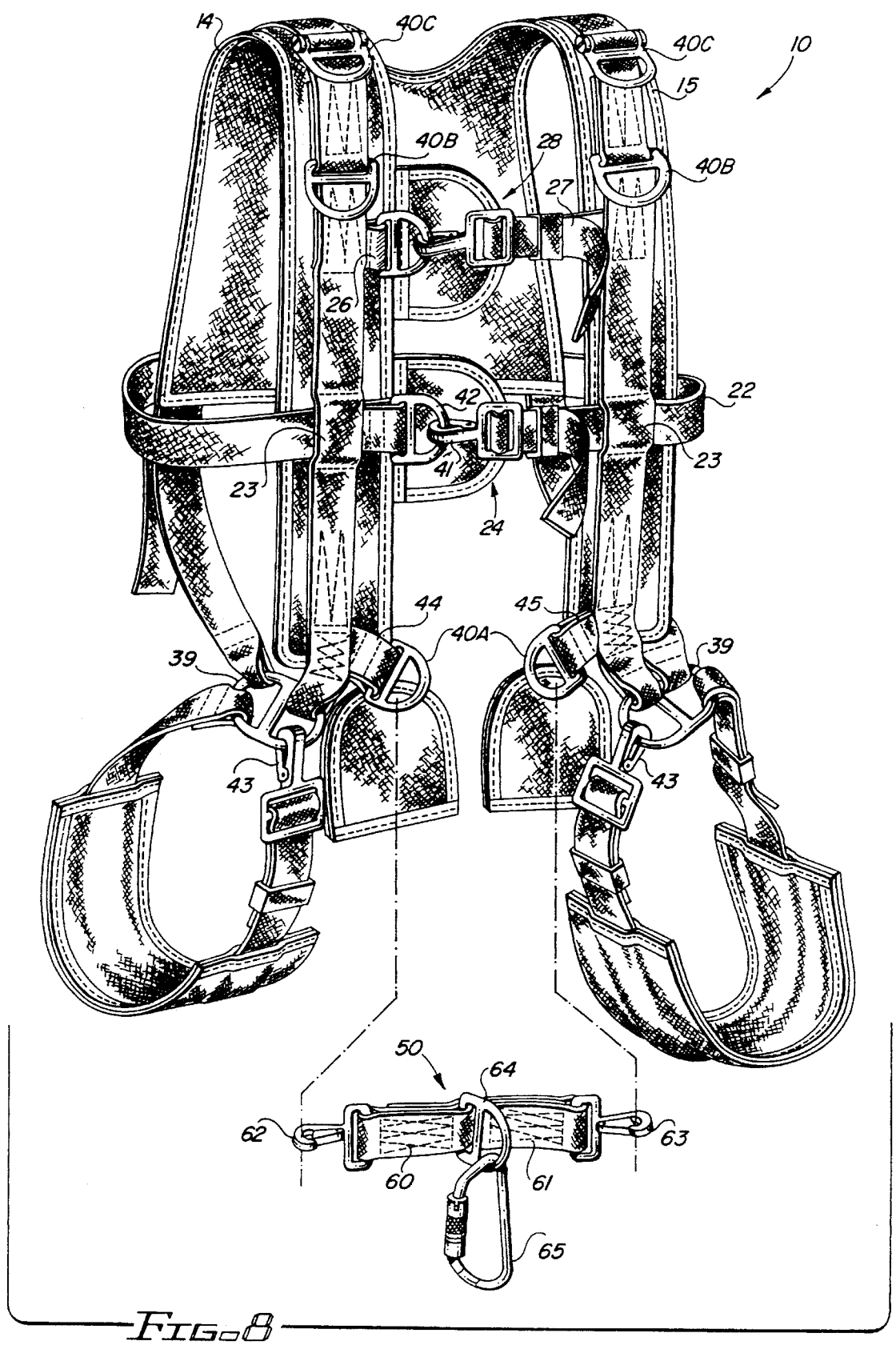
FIG. 8 is a perspective front and left side view of an alternate embodiment of the multipurpose vest and harness employing the invention including a rappelling attachment.
Figure 9:
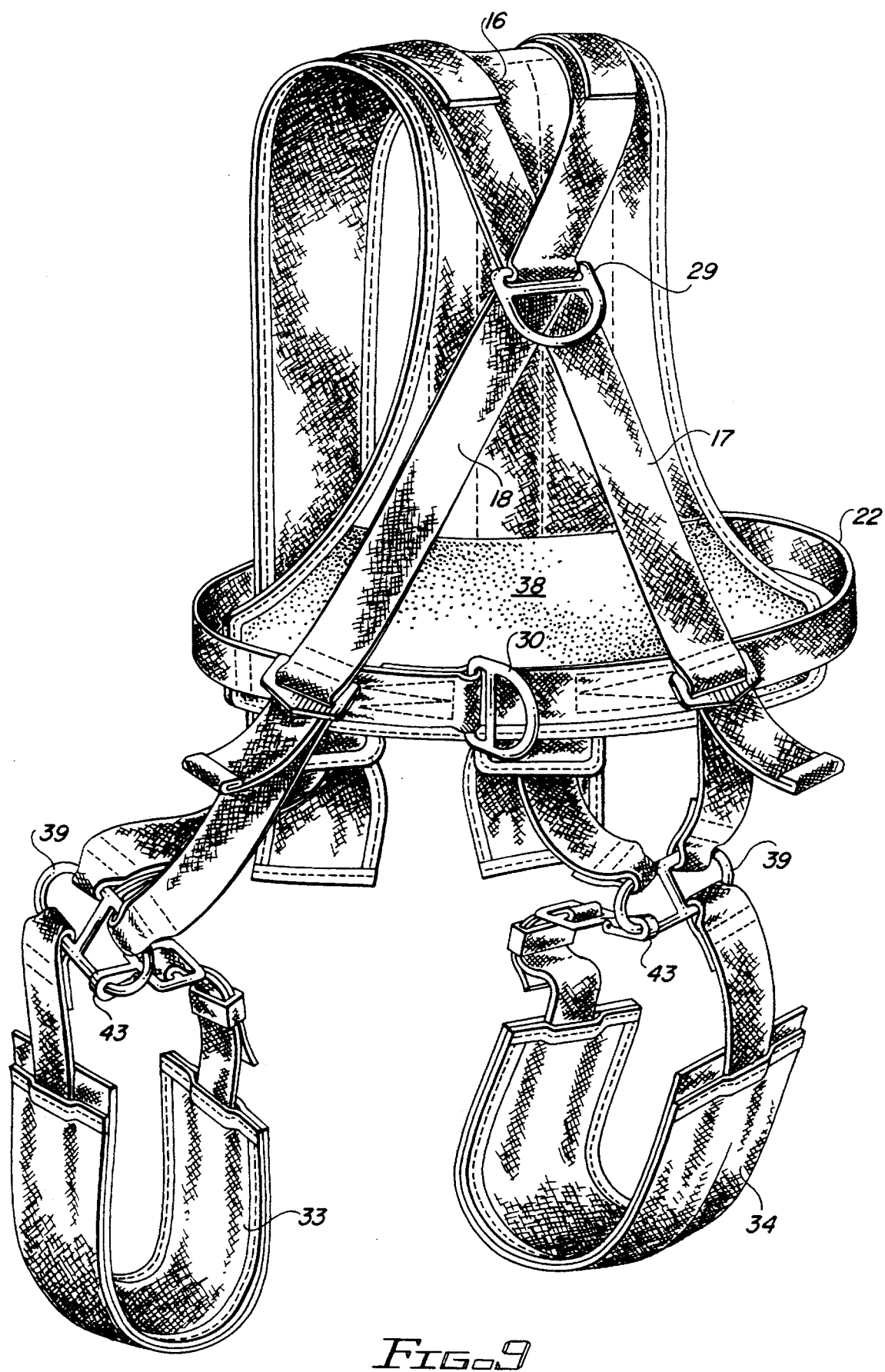
FIG. 9 is a perspective back and left side view of another variation of the vest and harness shown in FIG. 8.

At the junction where the free ends of webs 17 and 18 are connected to either the metal ring 19 or the double D-ring 39, a pair of web sections 44 and 45 are stitched at one end thereof to webs 17 and 18 and are provided at the other end with either a clamp on metallic ring or triangle 20A as shown in FIG. 2 or a D-ring 40A as shown in FIG. 8 for use in attaching to either a retractable reel and belt 21 in combination as shown in FIG. 1 or to a rappelling accessory 50 as shown in FIG. 8.

At the top of the vest, webs 17 and 18 extend over the shoulders of the wearer and criss cross the back of the vest to its base where they are attached to a substantially horizontal positioned strip or web 22. At the top of the shoulders, each web 17 and 18 may be provided with a D-ring 40C as shown in FIGS. 8 and 10 for use in attaching to an extriction yoke 49 as seen in FIG. 10.

Web 22 is suitably stitched to the back of the vest and extends loosely through loops 23 formed in the diagonal sections of webs 17 and 18 to the front of the vest where the free ends of web 22 are clamped together by a suitable buckle arrangement 24.

As shown in FIGS. 2 and 8, a pair of web sections 26 and 27 are stitched to vest sections 14 and 15 and are interconnected by a buckle arrangement 28 at the point of divergence of the diagonal portions of webs 17 and 18 from their vertical positions.

Each of buckles 24 and 28 comprise either a clasp 31 shown which engages with a ring like clamp or frame 32 as shown in FIG. 2 or, more preferably, a B-12 quick ejector snap 41 which engages a double D-ring 42 shown in FIG. 8 each fastened to a different end of the associated web.

At the junction of the vertically positioned portions of webs 17 and 18 with the web sections 26 and 27, each web is provided with either a clamp on metallic ring or triangle 20B as shown in FIG. 2 or a D-ring 40B as shown in FIG. 8 for use in attaching to a retractable reel and belt 21 in combination as shown in FIG. 1 or extriction yoke 49.

As shown in FIGS. 3 and 9, a pivotally mounted ring like metal frame 29 is provided at the point where webs 17 and 18 cross and is provided with a slot through which webs 17 and 18 pass for holding the webs together.

Web 22 is also provided with a pivotally mounted ring like metal frame 30 at the mid section of the back of the wearer as shown in FIGS. 3 and 9, anchored by the stitching of web 22 across the back of the vest.

Figure 4:
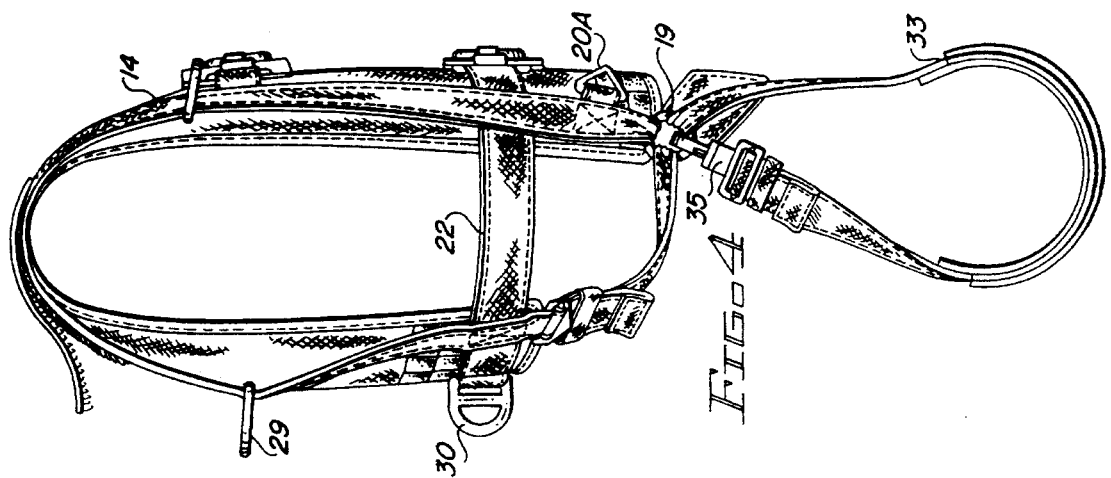
FIG. 4 is a left side view of FIG. 2.

Leg loops 33 and 34 are fastened at one end to rings 19 and extend between the legs of the user and the other ends thereof are then attached by a B-12 snap 35 to rings 19 as shown in FIG. 4. Alternatively, leg loops 33 and 34 are fastened at one end to double D-rings 39 and extend between the legs of the user and the other ends thereof are then attached by B-12 snap 43 to double D-rings 39 as shown in FIG. 8.

When in use, the vest portion of the device is positioned over the shoulders of the wearer and the leg loops 33 and 34 are positioned around the legs of the user and clamped in place.

Next, the buckles 24 and 28 are engaged with the associated ring like frames.

Figure 7:
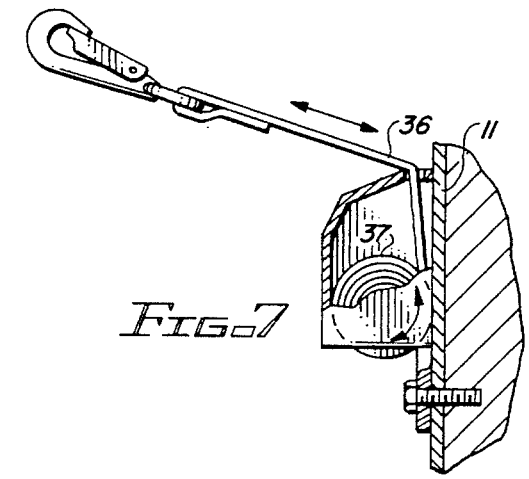
FIG. 7 is an illustration showing one embodiment of an inertial reel and clasp.

With the vest and harness adjusted, when riding in the ambulance the ambulance attendant then attaches the free ends of two wall mounted retractable belts 36, one of which is shown in FIGS. 7 and 12, to the associated ring like frames 29 and 30.

After this action, the user then connects a further retractable belt 21 mounted on the other inside wall or ceiling of the ambulance to one of rings 20 or 40. By selectively picking the ring to which inertial reel 37 with retractable webbing 21 is attached, the attendant can select the most desirable restricted position for his first aid efforts.

Figure 5:
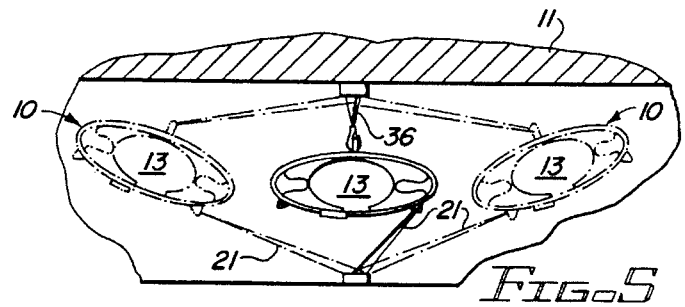
FIG. 5 is a diagrammatic view of the movements of an attendant using the vest and harness combination.
Figure 6:
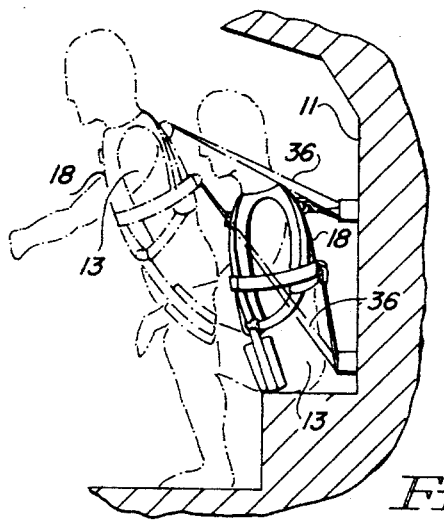
FIG. 6 is an illustration of an attendant wearing one embodiment of the vest and harness device and illustrating the back supports with the front support omitted.

FIGS. 5 and 6 illustrate various movements of the attendant when contained by the dual purpose vest and harness device disclosed herein.

It should be noted that the retractable webbing 21 and 36 operate in the manner of a vehicle mounted seat belt and comprise inertial reel 37 that meets FAA specifications.

In an alternate reel embodiment best seen in FIG. 13, retractable webbing 36 is directed through a slotted guide 46 which is positioned proximate to reel 37. Guide 46 and reel 37 are rotatable about their respective mounts 47 and 48. The guide 46 prevents fouling of belt 36 when twisted at large angles from reel 37 and thus enhances the operation of reel 37.

Alternatively, outside of the ambulance the wearer of the vest and harness can employ accessories such as extriction yoke 49 as seen in FIGS. 10 and 11 or rappelling accessory 50 as seen in FIG. 8.

Extriction yoke 49 is useful in raising and lowering a wearer from a helicopter. Yoke 49 includes two symmetrical arm webs 51 and 52 are joined at one end thereof and are provided at the other end with a B-12 snaps 54 and 55 as shown in FIG. 10 for use in attaching to either pair of D-rings 40B or 40C on the vest and harness 10. The pair of D-rings used is dependent upon the orientation of the wearer as desired. Use of the D-rings 40C mounted at the top of the shoulders will maintain the wearer in essentially a vertical position. Use of the D-rings 40B mounted at the point web sections 26 and 27 are located will position the wearer at rearwardly tilted angle.

A D-ring 53 is provided at the point where webs 51 and 52 are joined to allow a clamp or hook from a helicopter (not shown) to be attached thereto.

To provide a wearer with head clearance, a separator bar 56 is mounted between webs 51 and 52. As best seen in FIG.

11, separator bar 56 is a fiberglass or a hollow metal rod 57 which is encompassed by a nylon framework 58. Framework 58 is stitched to webs 51 and 52. To prevent inadvertent injury, a foam layer 59 surrounds frame 58 and is held in place by a nylon cover 60. Cover 60 is a one piece unit which wraps around layer 59 and overlaps itself where it is joined via a hook and loop strips 61 such as Velcro.

Rappelling accessory 50 shown in FIG. 8 allows the wearer to rappel cliffs, buildings and the like to reach injured persons. Rappelling accessory 50 includes two symmetrical webs 60 and 61 are joined at one end thereof and are provided at the other end with a B-12 snaps 62 and 63 as shown in FIG. 8 for use in attaching to a pair of D-rings 40A on the vest and harness 10.

A D-ring 64 is provided at the point where webs 60 and 61 are joined to a rappelling ring 65.

To highlight the safety vest and harness, various part of it may include a brightly colored or reflective portion 38 to draw attention.

Although only certain embodiments of the invention have been illustrated and described, it will be apparent to those skilled in the art that various changes and modifications may be made therein without departing from the spirit of the invention or from the scope of the appended claims.

That which is claimed is:

1. A vest and harness combination comprising:

a sleeveless vest formed of a fabric material for covering the shoulders, front and back of a wearer, a harness secured to said vest and comprising a first pair of spaced webs attached to and extending longitudinally along the front of said vest and a second pair of spaced webs attached to said vest and extending laterally of said first pair of webs at least partially around said vest, said first pair of webs extending over the shoulders of said vest, criss cross the back of said vest and fastened to opposite sides thereof, said first pair of webs at the point of criss crossing being provided with a slotted ring-like frame through which each of said first pair of webs extend, one of said pair of webs being provided with a second slotted ring-like frame at a point midway of the back of the vest, the other of said second pair of webs being provided with a slotted buckle at one end and a clasp at its other end for engaging said buckle, at least one additional ring-like frame attached to the front of the harness, each of said first, second and the at least one additional ring-like frames being detachably connectable to a retractable wall mountable reel for containment of the user of the vest and harness combination in a limited movable position, a pair of metallic rings one positioned at each of the opposite sides of said vest each attachable to both ends of one of said first pair of webs, and a third pair of webs for attaching one at each end thereof to a different one of said rings and the other end of each of said third pair of webs after completely surrounding a leg of a user to the associated one of said rings.

* * * * *